Jan. 23, 1934.   A. C. SCHOEPFER   1,944,277
MEANS FOR PRODUCING LAMINATED GLASS
Filed April 14, 1930   3 Sheets-Sheet 1
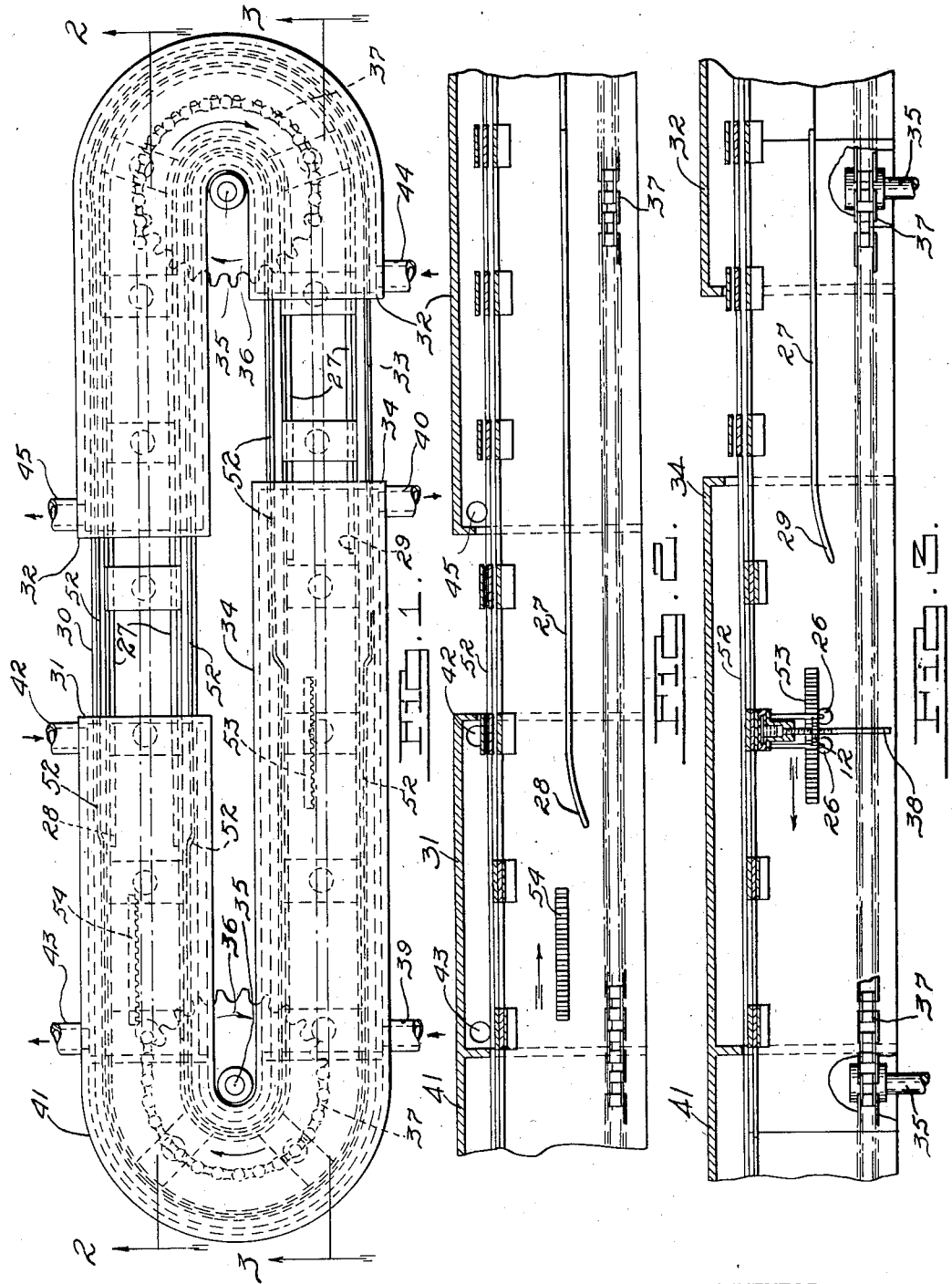
INVENTOR
*Alfred C. Schoepfer.*
BY
ATTORNEY

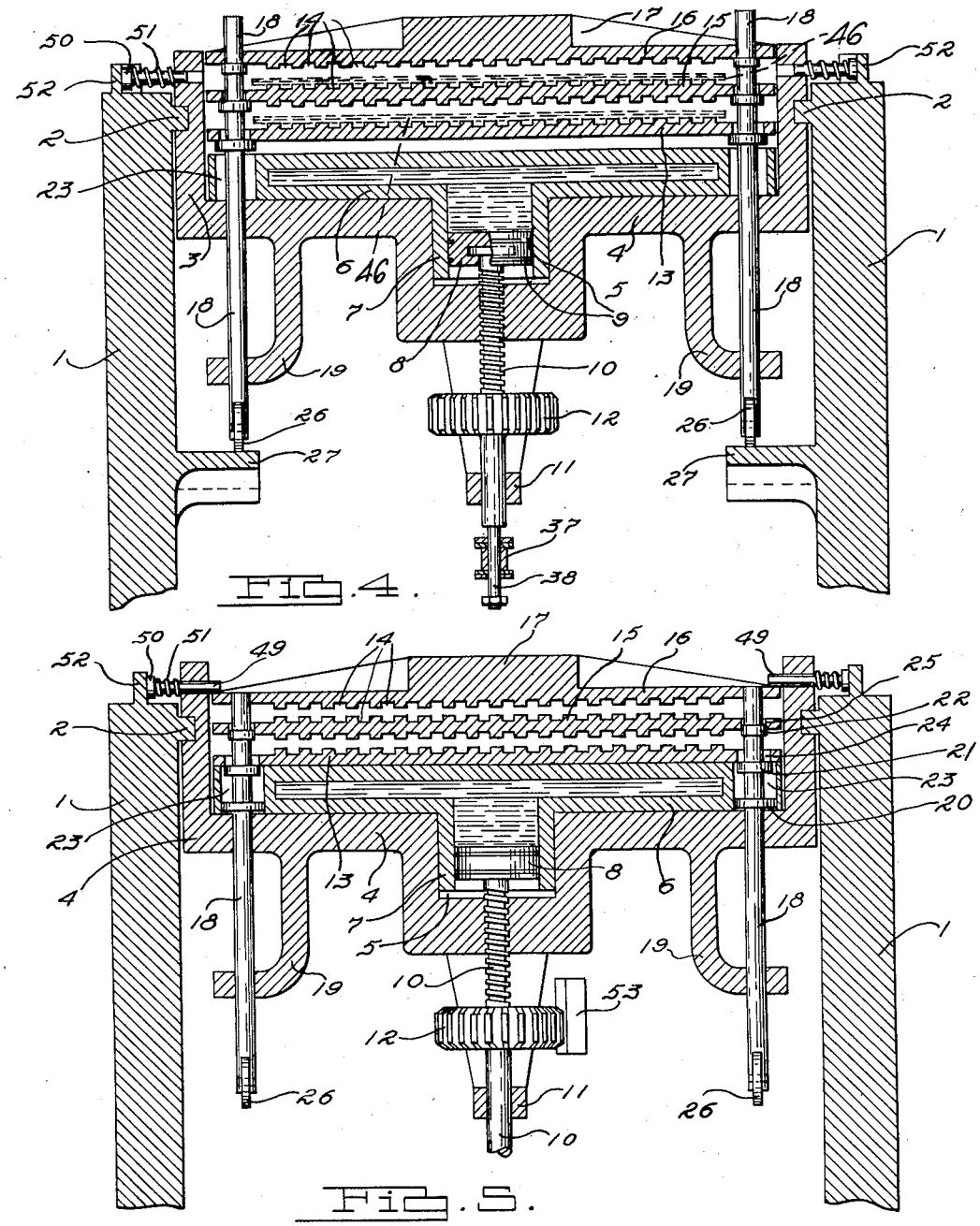

Jan. 23, 1934. A. C. SCHOEPFER 1,944,277
MEANS FOR PRODUCING LAMINATED GLASS
Filed April 14, 1930 3 Sheets-Sheet 3
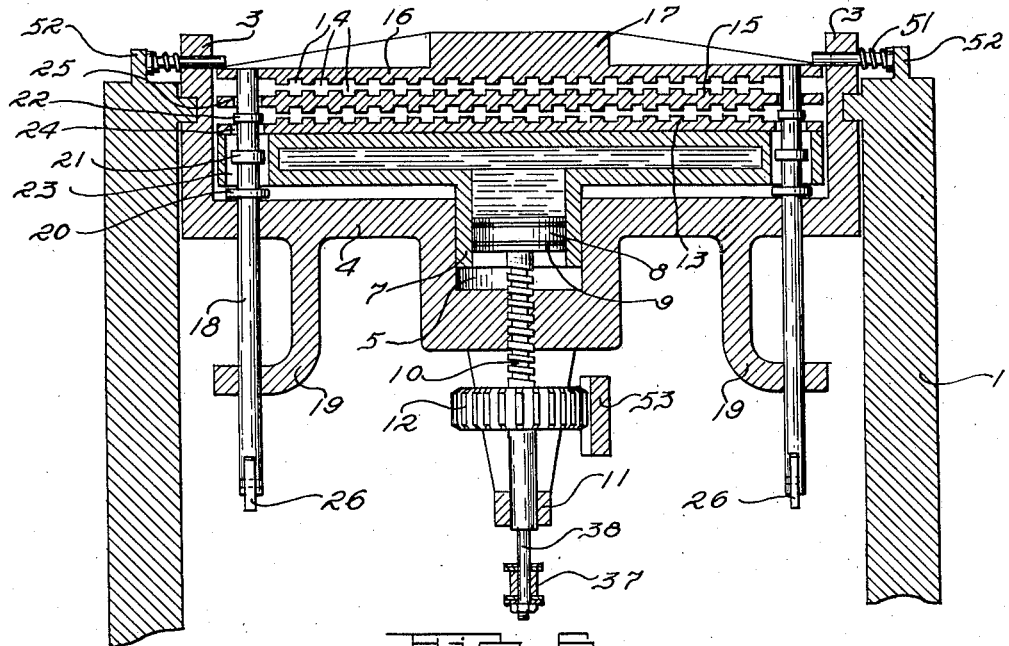
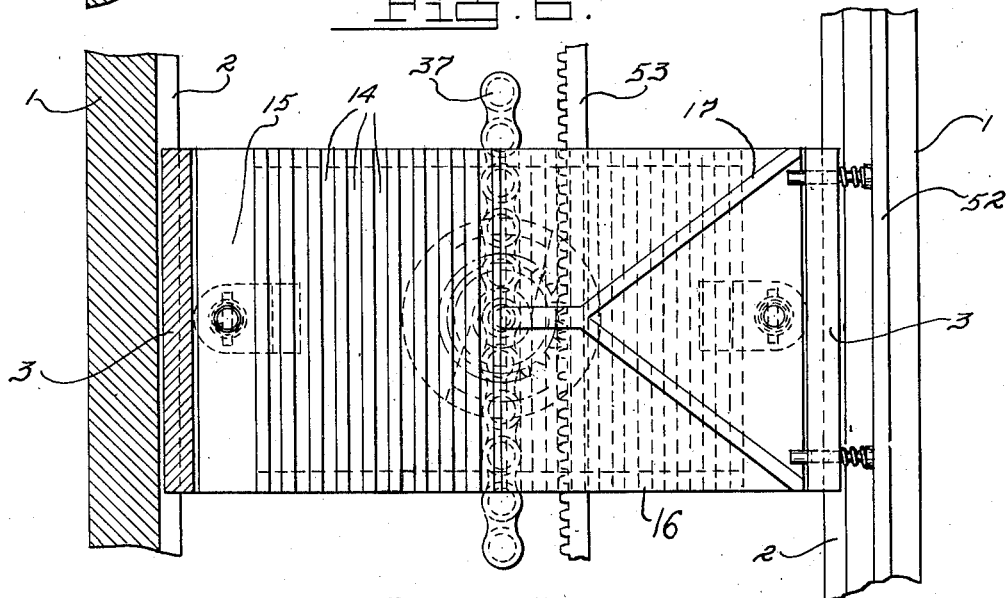
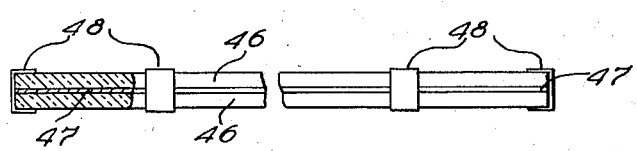
INVENTOR
Alfred C. Schoepfer.
BY
ATTORNEY Patented Jan. 23, 1934

1,944,277

UNITED STATES PATENT OFFICE 1,944,277

MEANS FOR PRODUCING LAMINATED GLASS

Alfred C. Schoepfer, Flint, Mich.

Application April 14, 1930. Serial No. 444,029

8 Claims. (Cl. 18—17)

This invention relates to method of and means for producing laminated glass and the object of the invention is to provide a means for continuously producing laminated glass under conditions which will reduce breakage to a minimum.

Another object of the invention is to provide a continuous machine for producing laminated glass in which a pressure is maintained on the laminated glass during its travel through the machine and the glass is carried through a heat treatment while maintained under a constant pressure.

A further object of the invention is to provide a conveyor having a series of presses in which the glass is carried through the conveyor, the pressure being automatically released at the end of the heat treatment.

Another object of the invention is to provide a series of presses in which the laminated glass is held under pressure, the presses being so arranged as to allow flow of air therethrough in contact with the laminated glass while the glass is held under pressure.

A further object of the invention is to provide a means for producing an air flow about the laminated glass while held under pressure in the presses, the air flow being carried out to produce a gradual change in temperature to prevent breakage of the laminated glass.

Another object of the invention is to provide automatic means for applying a hydraulic pressure evenly over the surface of each press independently while the presses are passing through the heating and cooling zones.

A further object is to provide automatic timed means for separating the press plates for loading and unloading the presses.

These objects and the several novel features of the invention are hereinafter more fully described and claimed and the preferred form of construction by which these objects are attained is shown in the accompanying drawings in which—

Fig. 1 is a plan view of a machine for continuously producing laminated glass embodying my invention.

Fig. 2 is a section taken on line 2—2 of Fig. 1.

Fig. 3 is a section taken on line 3—3 of Fig. 1.

Fig. 4 is an enlarged cross section through one of the presses showing the press plates separated for loading or unloading.

Fig. 5 is a similar view showing the press plates moved together after loading.

Fig. 6 is a view similar to Fig. 5 showing the hydraulic pressure applied to the press plates.

Fig. 7 is an enlarged plan view of one of the presses.

Fig. 8 is a section through the laminated glass sheets assembled for positioning in the machine.

The device comprises a pair of conveyor side rails 1 each having a rib 2 on which the carriers 3 are slidably mounted as shown in Figs. 4, 5, 6 and 7. The carriers 3 are U shaped in cross section, and are each provided with a flat bottom 4 having a recess 5 in the center. The carriers are open at the front and back down to the bottom portion 4 to allow the laminated glass to be readily inserted therein. A hydraulic press member 6 is positioned on the bottom 4 of each carrier as will be understood from Fig. 3 and each hydraulic press member is filled with a hydraulic medium as shown in Figs. 4, 5 and 6. Each hydraulic press member 6 is also provided with a cylinder 7 which extends downwardly into the recess 5 in the bottom of the carrier and a piston 8 is positioned in the cylinder 7 and is provided with a pair of piston rings 9 to prevent leakage of the hydraulic medium. A screw 10 is rotatably mounted in the piston 8 and is threaded through the bottom 4 of the carrier and is rotatably mounted at the lower end in a bracket 11 secured to the bottom 4 of the carrier. A gear 12 is secured to the screw shaft 10 between the bracket 11 and the bottom of the carrier and by rotating the gear 12 in either direction the screw shaft 10 may be threaded upwardly or downwardly through the bottom of the carrier to increase or decrease the pressure on the hydraulic medium in the hollow press member 6.

A press plate 13 is positioned on top of the press member 6 as shown in Figs. 5 and 6 and this press plate 13 is provided with a series of grooves 14 in the upper face thereof which extend longitudinally of the conveyor. The laminated glass is laid on the grooved face of the press plate 13 and the press plate 15, which is provided with a similarly grooved face on both the top and bottom, is positioned on the laminated glass. Another layer of laminated glass is positioned on the upper face of the press plate 15 as shown in Fig. 5 and a press plate 16 is positioned on top of the laminated glass. The press plate 16 is also provided with a grooved lower face which contacts the upper face of the glass and the press plate 16 is provided on top with rigid strengthening ribs 17 as shown in Figs. 5 and 7. While I have shown a series of three press plates, it will be readily understood that additional plates may be utilized depending upon the number of sheets of glass to be placed under pressure in the press.

A pair of vertically movable rods 18 are mounted in each carrier and in the brackets 19 connected to the carrier. Each rod 18 is provided with three collars 20, 21 and 22 on the upper end thereof and these collars are successively smaller in diameter toward the top of the respective rod 18. The press member 6 is provided with an aperture 23 through which the collar 20 is movable and the press plate 13 is provided with an aperture 24 through which the collar 21 may be moved but the aperture 24 is too small for the collar 20 to pass therethrough.

The press plate 15 is provided with an aperture 25 through which the collar 22 may pass but this aperture will not allow the collar 21 to pass therethrough. The end of the rod 18 above the collar 22 extends through an aperture provided therefore in the top plate 16 through which the collar 22 cannot pass.

When the two rods 18 are raised from the position shown in Fig. 5 to that shown in Fig. 4, the collars 22 raise the top press plate 16 away from the press plate 15 and the press plate 15 is raised by the collars 21 away from the press plate 13 while the press plate 13 is lifted off from the press member 6 by the collars 20. While the press plates are separated in this manner the laminated glass may be readily inserted edgewise between the plates or removed during the loading and unloading operations.

The rods 18 are each provided with a roller 26 in the bottom and the rods 18 are raised by riding up onto a track or flange 27 shown in Fig. 4. These tracks are formed integrally with the conveyor walls 1 and extend from the point 28 and around the conveyor walls to the point 29 shown in Figs. 1, 2 and 3. The conveyor is laid out in a continuous track form as shown in Fig. 1 and the presses are unloaded at the point 30 between the housings 32 and 34 shown in Fig. 1.

At each end of the conveyor is a vertical shaft 35 each having a large sprocket 36 secured thereto. These sprockets are connected by an endless conveyor chain 37 and one of the sprockets is driven to drive the conveyor chain. The shaft 10 of each carrier press is provided with a lower end 38 of smaller diameter as shown in Figs. 4 and 6.

The lower end 38 of each shaft 10 is pivotally mounted in one of the links of the conveyor chain 37. By this arrangement as the conveyor chain is moved the carriers are moved along on the ribs 2 of the conveyor walls 1. As the carriers 3 come to the ends of the conveyor the sprocket 36 engages in and forms a firm support for the conveyor chain so that the carriers are carried by the conveyor chain and moved around the end of the conveyor but the sprocket 1 in reality carries and supports the shafts 38 of the carriers around the semi-circular end of the conveyor. The semi-circular end of the conveyor is preferably of sufficient diameter so that the edges of the carriers 3 which engage on the ribs 2 of the conveyor walls 1 will not bind in moving around the end of the conveyor.

The housing 34 which incloses a portion of the conveyor is provided with a hot air inlet 39 at one end and an outlet 40 at the opposite end. The movement of the carriers through this housing 34 is toward the left of Figure 1 while the movement of the heated air is through the housing 34 toward the right of Fig. 1. In this manner as the carriers move through the housing 34, the temperature of the carriers is continuously raised until the carriers pass out of the end of the housing and the heat transfer between the heated air and the carriers is gradual and at the same time is effective as the heated air may flow through the longitudinal grooves 14 in the press plates and about the several sheets of laminated glass.

As the carriers pass out of the housing 34 they travel through the semi-circular housing 41 at the left end of Fig. 1. This housing 41 provides a neutral chamber in which the heat of the press plates and carriers is allowed to normally decrease before passing into the housing 31 as there is no induced air flow through the chamber 41. The housing 31 forms a cooling chamber to cool the presses and laminated glass so that the glass may be handled when it reaches the unloading position 30. The housing 31 is provided with an inlet 42 through which cold air is blown and this cold air flows through chamber 31 toward the outlet 43 and contrary to the movement of the conveyor so that this cold air passes over the presses and through the grooves 14 in the press plates to cool the laminated glass as well as the presses. Here also the principle of the heat transfer is utilized as the presses enter the chamber 31 at the end where the air is warmed by heat transfer and pass steadily into the decreasing temperatures toward the cold air inlet 42. When the presses pass out of the housing 31 the laminated glass plates are cool enough for handling. The housing 32 forms a pre-heating chamber for the presses after the presses have been unloaded at the point 30. This chamber 32 extends around the conveyor to the point 33 where the presses are loaded and heated air is forced into this chamber through the inlet 44 and passes through the press plates which are separated in the position shown in Fig. 4 while passing through the chamber 32.

In this manner the press plates and carriers are preheated by heat transfer and the air is discharged from the chamber through the outlet 45. When the presses reach the point 33 they are again loaded with laminated glass plates by an operator standing at the point 33 who inserts the glass plates between the press plates.

Each laminated glass plate comprises two sheets of glass 46 as shown in Fig. 8 between which a non-brittle sheet 47, such as celluloid, pyroxylin or the like, is inserted. In order that these glass plates may be readily inserted between the press plates a strip of adhesive tape 48 is applied to the edges of the glass plates at intervals so as to hold the units together and allow them to be readily handled while being inserted between the press plates. These units are usually stacked up adjacent the loading point 33 so as to be handy to the operator. The units are inserted between the press plates as shown in dotted lines in Fig. 4 and as the presses pass into the chamber 34 the rollers 26 on the two rods 18 pass down the inclined end 29 of the track or flange 27. As these rollers 26 pass off from the inclined end 29 the collars 20 on the rods 18 rest on the bottom 4 of the carrier. This movement lowers the press plates onto the laminated glass units as shown in Fig. 5.

A series of pins 49 are carried in the upper edges of each carrier and these pins are each provided with a head 50 while a coiled spring 51 is positioned between the head of each pin and the adjacent face of the carrier. These springs 51 tend to move the pins outwardly into engagement with the cam flange 52 on the upper edge of the conveyor wall 1. The heads of the pins 49 travel in continuous contact with the cam flanges 52 and after the rollers 26 have passed off from the end 29 of the track 27 the flanges 52 as shown in Fig. 1 move the pins 49 inwardly against the tension of the springs 51 so that the pins 41 engage over the upper press plate 16 as shown in Fig. 5. The shape of the cam flange 52 to produce this movement is shown in dotted lines in Fig. 1. After the pins 49 have engaged over the press plates the gear 12 on the shaft 10 moves into engagement with the rack 53 which is stationary and rotates the gear 12 to apply a pressure to the press 6. This presses the press plates upwardly against the pins 49 and as the gear 12 passes off from the rack 53 the press plates are maintained under this pressure. The press plates are maintained under pressure while traveling through the housing 34 and 41 and as the carriers pass through the cooling chamber 31 the gear 12 engages a rack 54 which is on the opposite side of the gear 12 and produces reverse rotation of the gear 12 thus releasing the pressure on the press member 6. After passing off from the rack 54 the cam flanges 52 are spaced apart a greater distance to allow the pins 49 to be moved outwardly by the springs 51 to the position shown in Fig. 4.

At this time the rollers 26 on the rods 18 ride onto the sloping end 28 of the flange 27 shown in Fig. 2, thus separating the press plates to the position shown in Fig. 4, so that as the carriers move to the unloading point 30, the press plates are separated and the laminated glass which has been cooled in passing through the cooling chamber 31, may be readily removed from between the press plates. These press plates remain in the separated position shown in Fig. 4 while they are passing through the pre-heating chamber 32 to the loading platform 33.

At all times during travel of the carriers and press plates through the conveyor the air may readily pass about the press plates and through the grooves 14 therein which are provided to allow ready heat transfer to the laminated glass.

From the foregoing description it becomes evident that the device is very simple and efficient in operation, provides gradual temperature changes throughout the travel of the presses through the conveyor, maintains the laminated glass under pressure while being heated and cooled and provides a device which accomplishes the objects described.

Having thus fully described my invention, its utility and mode of operation, what I claim and desire to secure by Letters Patent of the United States is—

1. In a machine for continuously producing laminated glass, a pre-heating oven, a heat treating oven and a cooling chamber, a conveyor extending through the ovens and cooling chamber, a series of carriers carried by the conveyor, a series of press plates in each carrier adapted to receive laminated glass therebetween, automatically operated means for placing and maintaining a pressure on the press plates while passing through the heat treating oven, automatically operated means for releasing the pressure on the press plates while traveling through the cooling chamber, automatically operated means for separating the press plates as they are discharged from the cooling chamber and means for maintaining the press plates separated while passing through the pre-heating oven.

2. In a machine for continuously producing laminated glass, a pre-heating oven, a heat treating oven, and a cooling chamber, a conveyor extending through the ovens and cooling chamber, a series of carriers carried by the conveyor, a series of press plates in each carrier adapted to receive laminated glass therebetween, automatically operated means for holding the press plates separated while passing through the pre-heating oven and automatically operated means for closing the press plates and maintaining a pressure thereon while passing through the heat treating oven and cooling chamber.

3. In a machine of the character described, a carrier, a series of press plates mounted in the carrier and adapted to receive laminated glass therebetween, each press plate being provided with channels in the face thereof in contact with the glass, a heat treating oven, means for conveying the carrier through the heat treating oven, means for passing heated air through the oven in a reverse direction to the movement of the carriers, the channels in the face of the press plates extending longitudinally of the oven and being adapted to allow flow of heated air therethrough.

4. In a machine for producing laminated glass, a series of heat treating ovens, an endless conveyor extending through the ovens, a series of carriers adapted to be moved through the ovens by the conveyor, a series of press plates in each carrier, automatically operated means for applying pressure of the press plates, automatically operated means for releasing the pressure on the press plates and automatically operated means for separating the press plates subsequent to releasing the pressure thereon.

5. In a machine for continuously producing laminated glass, a heat treating oven, a conveyor extending through the oven, a series of carriers adapted to be moved through the oven by the conveyor, a series of press plates in each carrier and means operated by movement of the carriers through the oven for placing a pressure on the press plates.

6. In a machine for producing laminated glass a series of heat treating ovens, an endless conveyor extending through the ovens, a series of carriers adapted to be moved through the ovens by the conveyor, a series of press plates in each carrier and means for automatically separating the press plates and maintaining them in spaced relation to allow insertion of laminated glass therebetween.

7. In a machine for producing laminated glass, a series of heat treating ovens, a conveyor extending through the ovens, a series of carriers adapted to be moved through the ovens by the conveyor, a series of press plates in each carrier and automatically operated means for placing a pressure on the press plates while traveling through the said ovens.

8. In a machine for continuously producing laminated sheets, a pre-heating oven, a heat treating oven and a cooling chamber, a conveyor extending through the ovens and cooling chamber, a series of carriers carried by the conveyor, a series of press plates in each carrier adapted to receive laminated sheets therebetween, automatically operated means for holding the press plates separated while passing through the pre-heating oven and automatically operated means for closing the press plates and maintaining a pressure thereon while passing through the heat treating oven and cooling chamber.

ALFRED C. SCHOEPFER.